June 6, 1939.  H. S. FRITTS  2,161,343
ANTISKID CHAIN UNIT
Filed Aug. 16, 1938   2 Sheets-Sheet 1
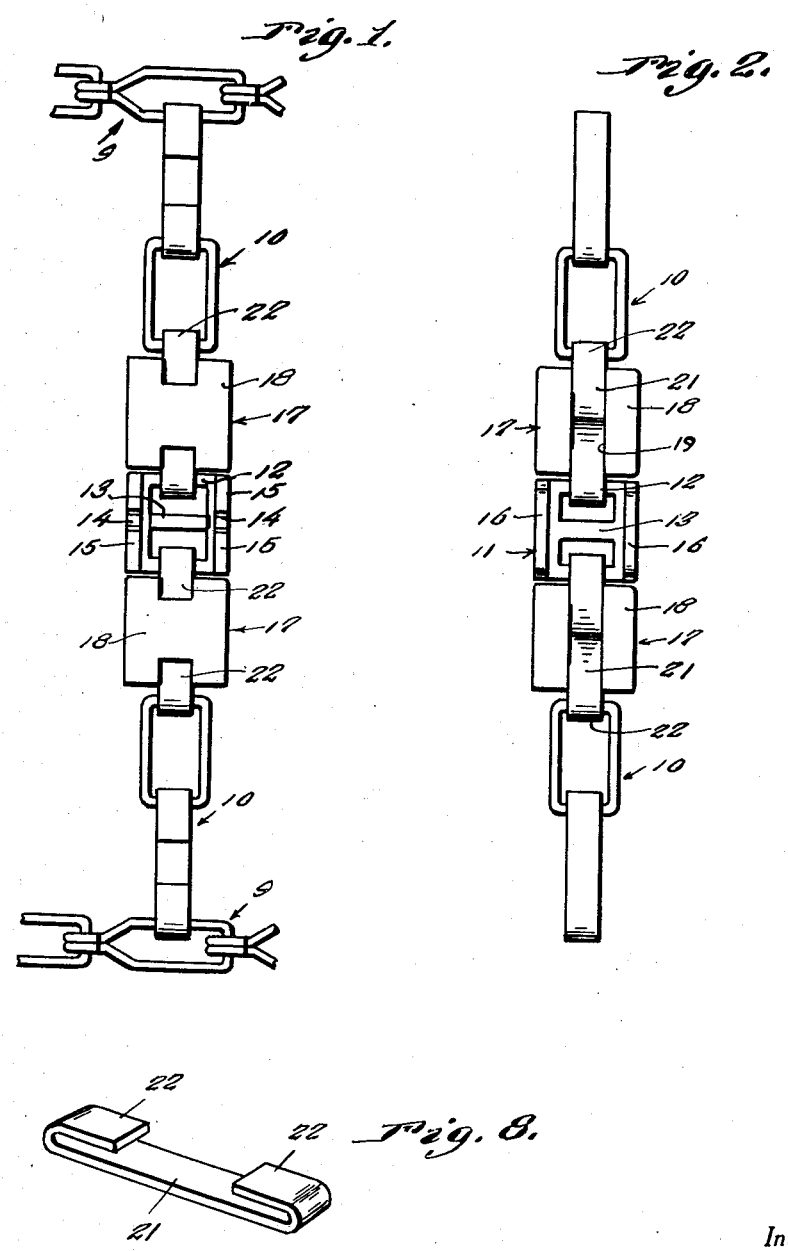

June 6, 1939. H. S. FRITTS 2,161,343
ANTISKID CHAIN UNIT
Filed Aug. 16, 1938  2 Sheets-Sheet 2
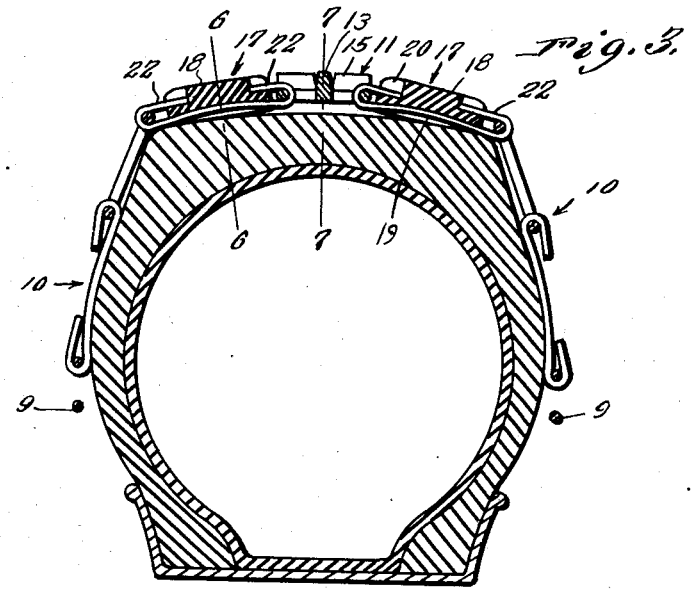
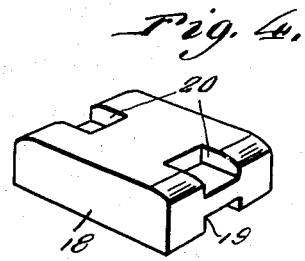
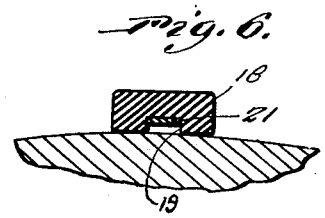
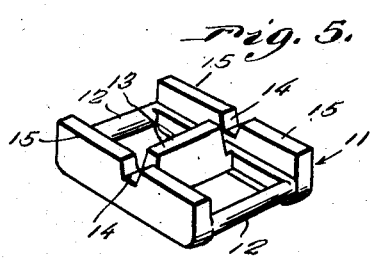
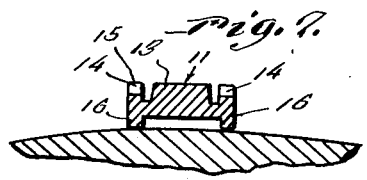
Inventor
H. S. Fritts
By Clarence A. O'Brien
and Hyman Berman
Attorneys Patented June 6, 1939

2,161,343

UNITED STATES PATENT OFFICE 2,161,343

ANTISKID CHAIN UNIT

Howard S. Fritts, Washington, N. J.

Application August 16, 1938, Serial No. 225,219

3 Claims. (Cl. 152—243)

The present invention relates to an improved anti-skid unit which is expressly, but not necessarily, adapted for use as a transverse or cross chain between longitudinal or circumferential side chains, and the outstanding object is to specifically improve on units of this type through the adoption and use of individually new parts combining in a collective sense to provide a wholly new cross chain.

Contrasted structurally with the prior art to which the invention relates, the subject matter herein disclosed and claimed is perhaps most similar to that disclosed in prior Patent No. 2,100,539, and granted to me under date of Nov. 30, 1937. In the prior patented arrangement one phase of the novelty had reference to a centralized main rubber cushioned tread block having on opposite sides thereof interlinked auxiliary metallic blocks, the latter having flexible chain link connection with the circumferential side chains of the whole assembly.

In reducing to practice the principles of the present conception there has been a transposition and somewhat reversal of companion features. That is to say, in the present arrangement I utilize an especially designed metallic main central block, there being a pair of coordinated rubber cushioned blocks on opposite sides thereof, the rubber blocks being pivotally adjoined to the metallic block and also linked to the side chains.

More specifically, novelty is predicated on the master central metallic block, this being of openwork rectangular frame-like design and provided on longitudinal edges with parallel anti-skid lugs or flanges, being further provided on that side contacting the tread of the tire with ribs adapted to be partly embedded in the tread of the tire casing to firmly maintain said master block against slippage in relation to the tire.

Additional and more specific novelty is predicated on the especially notched and grooved rubber cushions or blocks and the bent metal straps associated therewith wherein the strap ends function as pivoting links to facilitate assembling and maintenance of the parts.

Other features and advantages will become more readily apparent from the following description and drawings.

In the drawings:

Figure 1 is a top plan view showing the improved cross chain and fragmentary portions of the side chains.

Figure 2 is a bottom plan view of said cross chain unit.

Figure 3 is a transverse section through the conventional tire showing the position and relationship of the improved cross chain.

Figure 4 is a perspective view of one of the especially designed rubber cushion-blocks.

Figure 5 is a perspective view of the openwork approximately H-shaped metallic master block.

Figures 6 and 7 are sections on the lines 6—6 and 7—7 respectively of Figure 3.

Figure 8 is a perspective view of one of the especially bent link forming metal straps.

As is evident from Figure 1, the circumferential side chains 9 are conventional. The cross chain is of a multiple part or composite structure. The triple featured assembly of coordinated blocks is the outstanding point of refinement, these parts being particularly claimed collectively and individually. The three blocks are pivotally adjoined to each other and in turn are connected with the side chains by way of suitable link connectors 10.

Reference being had to the master metallic central block in Figure 5, this is denoted by the numeral 11. It is of single cast construction and of general H-shaped configuration in top plan view. At the ends are suitable rounds 12 and at the center is a calk or lug 13. This is designed to guard against side skid, that is, skids toward either longitudinal edge or margin of the road. The ends of the central anti-skid lug 13 register or align with notches 14 existing between the group of four additional calks or lugs 15. This series of five lugs has been found to be adequate and satisfactory to serve mutually in arresting skidding in the path of movement of the car as well as at right angles or sidewise. There is another characteristic about this block to be observed and that is the fact that on the under side I provide lengthwise parallel ribs 16 and these rest in contact with and slightly embed themselves in the tread of the tire casing. Thus, the block 11 is virtually anchored against twisting or slippage on the tire.

I next call attention to the cushion unit or member 17 disposed on opposite sides of the master metal block 11. These are of duplicate construction and a description of one will suffice for both. Each comprises a substantially rectangular rubber block 18, this being provided in its under or inner side with a channel 19 and at opposite ends with adapter or keeper notches 20. A bendable metal strap 21 fits in the channel and the opposite ends 22 bend toward each other and are clenched into the notches. It will be observed that the bends extend beyond the opposite ends of the rubber block so as to provide links.

The links at one end connect with the aforementioned connectors 10. At the opposite ends the links of the respective devices 17 connect with the rounds 12 of the master block. This linkage arrangement maintains the block 18 more or less in straight across alignment with the intervening central block 11. It has been found that by providing two-way anti-skid lugs 13 and 15 in the main block 11 and then disposing adaptable cushioning rubber blocks on opposite sides thereof, an ideal assemblage of parts is thus brought into vogue to minimize slippage on ice and snow. An automobile wheel equipped with a chain having the construction described will be found usable with reasonable safety in applying the brakes while traveling at a fairly high rate of speed. It is not my intention, however, to delve into the scientific principles on which the statement is based. Nor is it necessary to elaborate on the commercial aspects of the assemblage as a whole. It may be mentioned however, that in the ordinary chain construction there will be a special cross chain between the side chains at substantially spaced intervals. Since almost all automobile tires, for vehicles of the pleasure type, are substantially standarized at the present time, the invention is applicable for use in a universal sense.

While it is an incidental feature, it is to be observed that the depth of the channel 19 in which the strap 21 is located is such as to permit portions of the rubber to protrude beyond the strap. This makes it possible for the inner or under side of the rubber block to reside in intimate contact with the rubber tread of the tire itself. Consequently, all three of the units maintain intimate contact with the tire and thus are held in substantial ever workable relationship.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a tire chain construction of the class described, a pair of attaching and supporting parallel side chains, a transverse anti-skid chain therebetween and including a central metallic multiple lug equipped member, and rubber cushioned members on opposite sides thereof, all of said members being pivotally adjoined together and the outermost members pivotally connected to the side chains.

2. A tire chain construction of the class described comprising a pair of longitudinal side chains and a cross chain mounted therebetween, said cross chain including a pair of rubber cushioned blocks adapted to rest in contact with the tread of the tire, said blocks having their outer end portions pivotally linked to said side chains, and an intervening all-metal block between the inner ends of said rubber blocks and pivotally linked thereto.

3. As a component part of a cross chain construction of the class described, an all-rubber block having a longitudinal groove in its bottom, and keeper notches in opposite ends, a metal strap seated in said groove and having its opposite ends projecting beyond the adjacent ends of the block and inturned and clenched into said notches to define attaching and assembling links.

HOWARD S. FRITTS.